United States Patent
Jang et al.

(10) Patent No.: US 10,956,708 B2
(45) Date of Patent: Mar. 23, 2021

(54) DISPLAY DEVICE COMPRISING A PLURALITY OF FIRST SENSING ELECTRODES DISPOSED RESPECTIVELY IN A PLURALITY OF FIRST GROOVES OF A COVER GLASS

(71) Applicant: Samsung Display Co., Ltd., Yongin-si (KR)

(72) Inventors: Hyoungwook Jang, Sejong-si (KR); Jeongyun Han, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 91 days.

(21) Appl. No.: 15/683,570

(22) Filed: Aug. 22, 2017

(65) Prior Publication Data

US 2018/0059452 A1  Mar. 1, 2018

(30) Foreign Application Priority Data

Aug. 29, 2016  (KR) ........................ 10-2016-0109739

(51) Int. Cl.
| | | |
|---|---|---|
| *G06K 9/00* | (2006.01) | |
| *G02F 1/1343* | (2006.01) | |
| *G02F 1/1333* | (2006.01) | |

(52) U.S. Cl.
CPC ....... *G06K 9/00053* (2013.01); *G02F 1/1343* (2013.01); *G06K 9/0002* (2013.01); *G06K 9/0008* (2013.01); *G02F 2001/133331* (2013.01)

(58) Field of Classification Search
CPC .............. G06K 9/0008; G06K 9/00053; G02F 2001/133331
See application file for complete search history.

(56) References Cited

U.S. PATENT DOCUMENTS

| | | | |
|---|---|---|---|
| 8,564,314 B2 | 10/2013 | Shaikh et al. | |
| 2012/0171497 A1* | 7/2012 | Koyama | C03C 3/085 428/428 |
| 2013/0050104 A1 | 2/2013 | Lee et al. | |
| 2013/0063891 A1* | 3/2013 | Martisauskas | G06F 1/1652 361/679.56 |
| 2014/0055685 A1* | 2/2014 | Wang | G06F 3/0412 349/12 |
| 2014/0184933 A1* | 7/2014 | Park | G06F 1/169 349/12 |
| 2014/0293162 A1* | 10/2014 | Park | G02F 1/133502 349/12 |
| 2014/0333328 A1* | 11/2014 | Nelson | G06F 3/044 324/663 |
| 2016/0041636 A1* | 2/2016 | Yun | G06F 3/044 349/12 |

FOREIGN PATENT DOCUMENTS

| | | | |
|---|---|---|---|
| KR | 10-2011-0127236 A | 11/2011 | |
| KR | 10-2013-0024100 A | 3/2013 | |
| KR | 10-2016-0023945 A | 3/2016 | |
| KR | 10-2016-0071352 A | 6/2016 | |
| WO | WO-2013032302 A2 * | 3/2013 | ............. G06F 3/041 |

* cited by examiner

*Primary Examiner* — Paul C Lee
(74) *Attorney, Agent, or Firm* — Lewis Roca Rothgerber Christie LLP

(57) ABSTRACT

A display device includes: a display panel including a plurality of pixels; a cover glass on the display panel and having a plurality of first grooves; and a plurality of first sensing electrodes respectively in the plurality of first grooves. The plurality of first grooves have a shape on a plane corresponding to a shape of the plurality of first sensing electrodes.

20 Claims, 9 Drawing Sheets

DISPLAY DEVICE COMPRISING A PLURALITY OF FIRST SENSING ELECTRODES DISPOSED RESPECTIVELY IN A PLURALITY OF FIRST GROOVES OF A COVER GLASS

CROSS-REFERENCE TO RELATED APPLICATION

This application claims priority to and the benefit of Korean Patent Application No. 10-2016-0109739, filed on Aug. 29, 2016 in the Korean Intellectual Property Office (KIPO), the disclosure of which is incorporated by reference herein in its entirety.

1. Field

Aspects of exemplary embodiments of the present invention relate to a display device and a method of manufacturing the display device.

2. Discussion of Related Art

In recent times, various functions have been added to display devices in addition to the function of displaying images. A display device including a fingerprint recognition sensor is an example thereof.

The fingerprint recognition sensors may be classified into a capacitive type, an optical type, a thermal type, and an ultrasonic type, as some examples. Among them, the capacitive type fingerprint recognition sensor includes sensing electrodes arranged significantly finely to recognize a fingerprint according to a capacitance difference based on a distance between a ridge and a valley of the fingerprint.

The sensitivity of a fingerprint recognition sensor may vary based on the permittivity of a cover glass, the thickness of the cover glass, or the like. For example, as the permittivity of the cover glass increases and the thickness of the cover glass decreases, the sensitivity of the fingerprint recognition sensor may increase.

However, there is a limit to these methods of improving the sensitivity of the fingerprint recognition sensor due to material properties and strength degradation problems of the cover glass.

The above information disclosed in this Background section is for enhancement of understanding of the background of the inventive concept, and therefore, it may contain information that does not form prior art.

SUMMARY

Exemplary embodiments of the present invention may be directed to a display device including a fingerprint recognition sensor having improved sensitivity and to a method of manufacturing the display device.

According to an exemplary embodiment of the present invention, a display device includes: a display panel including a plurality of pixels; a cover glass on the display panel and having a plurality of first grooves; and a plurality of first sensing electrodes respectively in the plurality of first grooves. The plurality of first grooves have a shape on a plane corresponding to a shape of the plurality of first sensing electrodes.

One of the first grooves may have substantially a same width as a line width of one of the first sensing electrodes.

Each of the first sensing electrodes may have a line width in a range from about several micrometers to about several tens of micrometers.

A pitch between adjacent ones of the first grooves may be in a range of about several micrometers to about several tens of micrometers.

The display device may further include a filling member on the first sensing electrodes.

The cover glass may have a thickness in a range from about 300 μm to about 550 μm.

Each of the first grooves may have a depth in a range from about 200 μm to about 450 μm.

The display device may further include a second sensing electrode between the cover glass and the display panel.

The cover glass may have a second groove crossing the first grooves.

The display device may further include a second sensing electrode in the second groove. The second sensing electrode may be insulated from and may cross the first sensing electrodes on a plane.

The second groove may have a shape on a plane corresponding to a shape of the second sensing electrode.

The second groove may have substantially a same width as a line width of the second sensing electrode.

According to an exemplary embodiment of the present invention, a method of manufacturing a display device includes: defining a plurality of first grooves in a cover glass; defining a plurality of second grooves in the cover glass to cross the first grooves; forming a plurality of first sensing electrodes respectively in the first grooves; placing a filling member on the first sensing electrodes; forming a plurality of second sensing electrodes respectively in the second grooves; and arranging the cover glass on a display panel. The display panel includes a plurality of pixels.

Each of the first grooves and the second grooves may have a width in a range from about several micrometers to about several tens of micrometers.

A pitch between adjacent ones of the first grooves and a pitch between adjacent ones of the second grooves may be in a range of about several micrometers to about several tens of micrometers.

According to an exemplary embodiment of the present invention, a display device includes: a display panel including a plurality of pixels; a cover glass on the display panel and having a plurality of first grooves and a plurality of second grooves crossing the first grooves; a plurality of first sensing electrodes respectively in the first grooves; and a plurality of second sensing electrodes respectively in the second grooves.

The foregoing is illustrative only and is not intended to be in any way limiting. In addition to the illustrative aspects and features of the embodiments described above, further aspects and features will be described and will become apparent by reference to the drawings and the following detailed description.

BRIEF DESCRIPTION OF THE DRAWINGS

A more complete appreciation of the present invention will become more apparent by describing, in detail, exemplary embodiments thereof with reference to the accompanying drawings, wherein.

DETAILED DESCRIPTION

Figure 1:
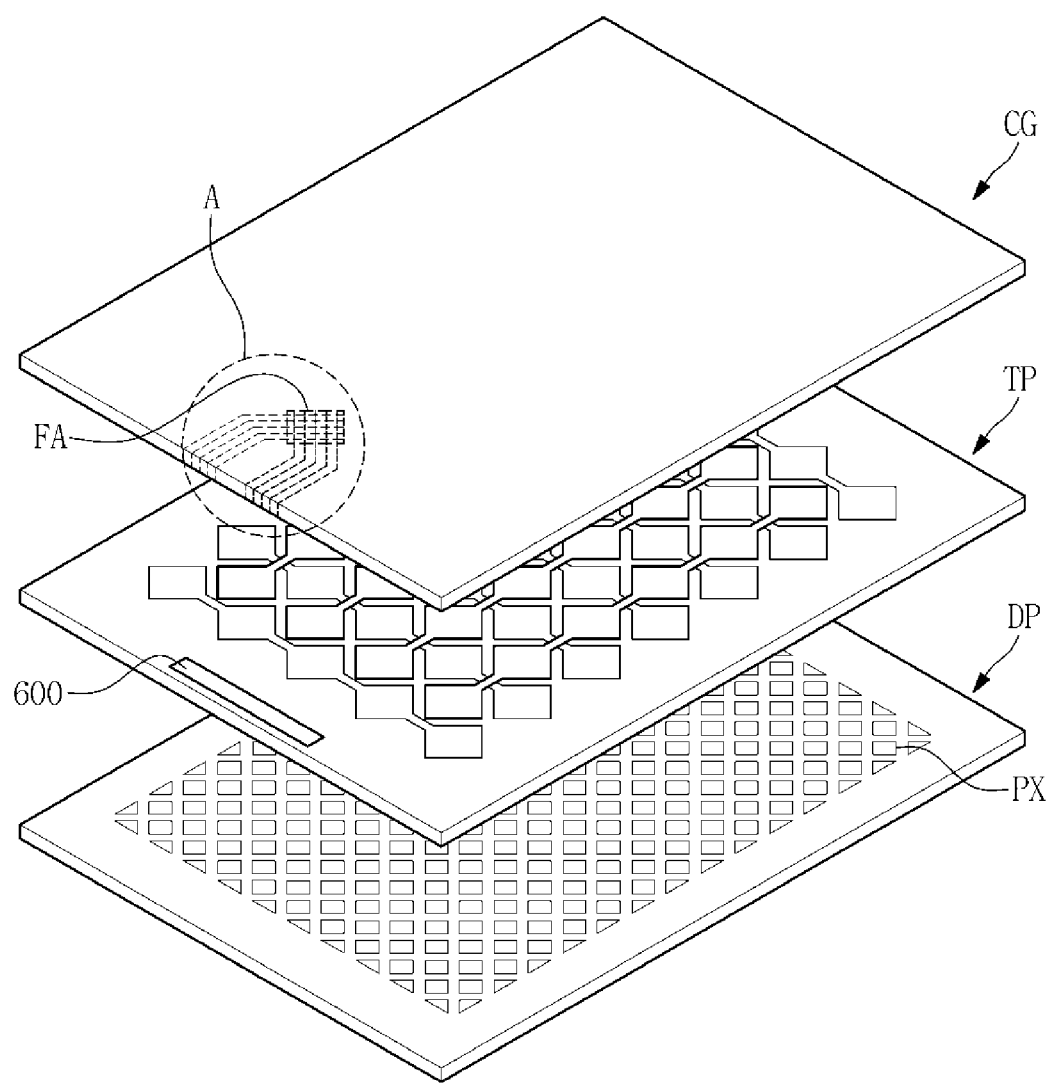
FIG. 1 is a schematic perspective view illustrating a display device according to a first exemplary embodiment.

Exemplary embodiments of the present invention will now be described more fully hereinafter with reference to the accompanying drawings. Although the present invention can be modified in various manners and may have several embodiments, exemplary embodiments are illustrated in the accompanying drawings and will be primarily described in the specification. However, the scope of the present invention is not limited to the exemplary embodiments described herein and should be construed as including all changes, equivalents, and substitutions included in the spirit and scope of the present invention.

In the drawings, thicknesses of layers and areas may be illustrated in an enlarged manner for clarity and ease of description thereof. When a layer, area, component, or plate is referred to as being "on" another layer, area, component, or plate, it may be directly on the other layer, area, component, or plate or intervening layers, areas, components, or plates may be present therebetween. When a layer, area, component, or plate is referred to as being "directly on" another layer, area, component, or plate, intervening layers, areas, components, or plates are absent therebetween. Further when a layer, area, component, or plate is referred to as being "below" another layer, area, component, or plate, it may be directly below the other layer, area, component, or plate or intervening layers, areas, component, or plates may be present therebetween. When a layer, area, component, or plate is referred to as being "directly below" another layer, area, component, or plate, intervening layers, areas, components, or plates are absent therebetween.

Spatially relative terms, such as "below," "beneath," "under," "above," "upper," and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawings is turned over, the device positioned "below" or "beneath" another device may then be "above" the other device. Accordingly, the illustrative term "below" may include both the lower and upper positions. The device may also be oriented in other directions, and thus, the spatially relative terms may be interpreted differently depending on the orientations.

Throughout the specification, when an element is referred to as being "connected" to another element, the element may be "directly connected" to the other element or "electrically connected" to the other element with one or more intervening elements interposed therebetween. It will be further understood that the terms "comprises," "comprising," "includes," and/or "including," when used in this specification, specify the presence of stated features, integers, steps, operations, elements, and/or components but do not preclude the presence or addition of one or more other features, integers, steps, operations, elements, components, and/or groups thereof. As used herein, the singular forms "a" and "an" are intended to include the plural forms as well, unless the context clearly indicates otherwise.

It will be understood that, although the terms "first," "second," "third," and the like may be used herein to describe various elements, these elements should not be limited by these terms. These terms are only used to distinguish one element from another element. Thus, a "first element" discussed below could be termed a "second element" or a "third element," and a "second element" and a "third element" can be termed likewise without departing from the teachings herein.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

Unless otherwise defined, all terms used herein (including technical and scientific terms) have the same meaning as commonly understood by those skilled in the art to which the present invention pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the present specification.

Some of the aspects, features, or parts which are not directly associated with the description of the exemplary embodiments below may be omitted in order to more clearly describe the exemplary embodiments of the present invention. Like reference numerals refer to like elements throughout the specification.

Figure 2:
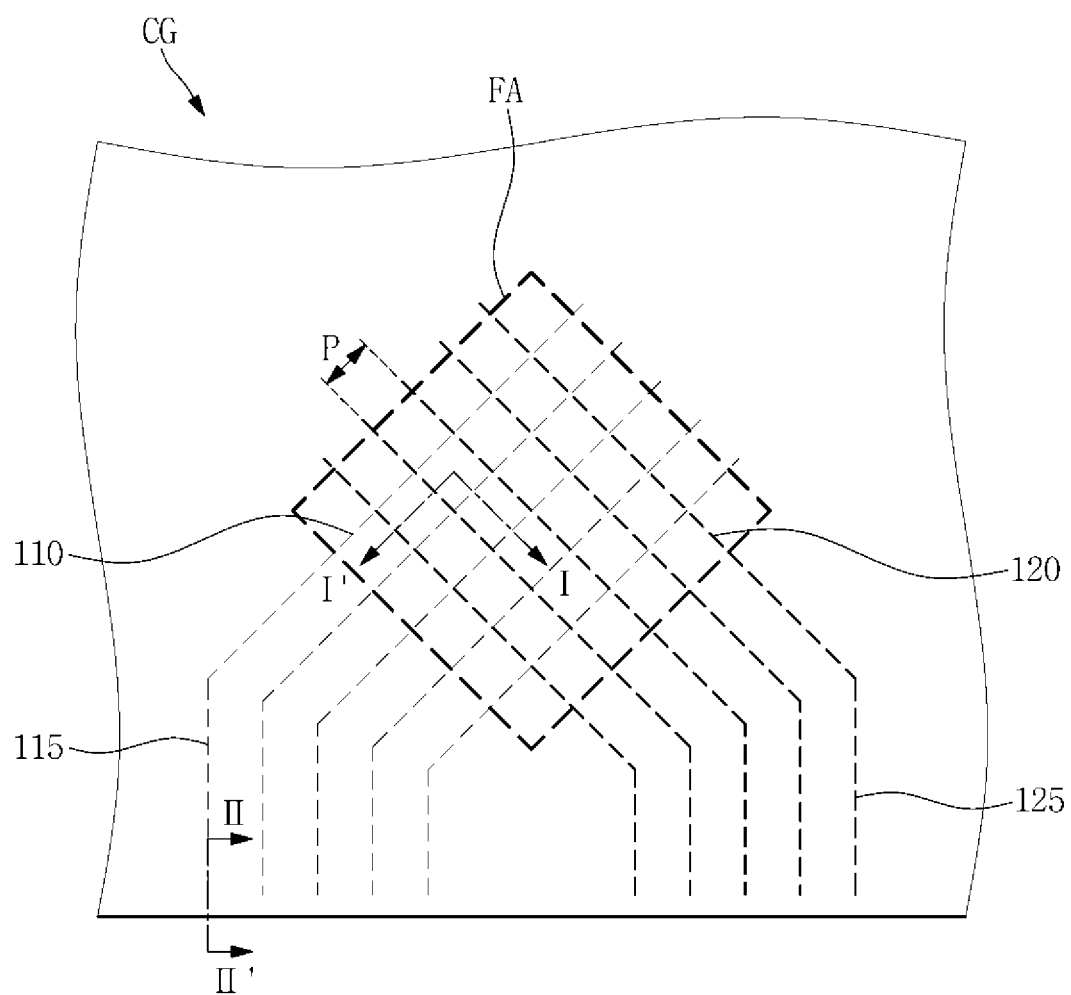
FIG. 2 is an enlarged view illustrating the area "A" of FIG. 1.
Figure 3:
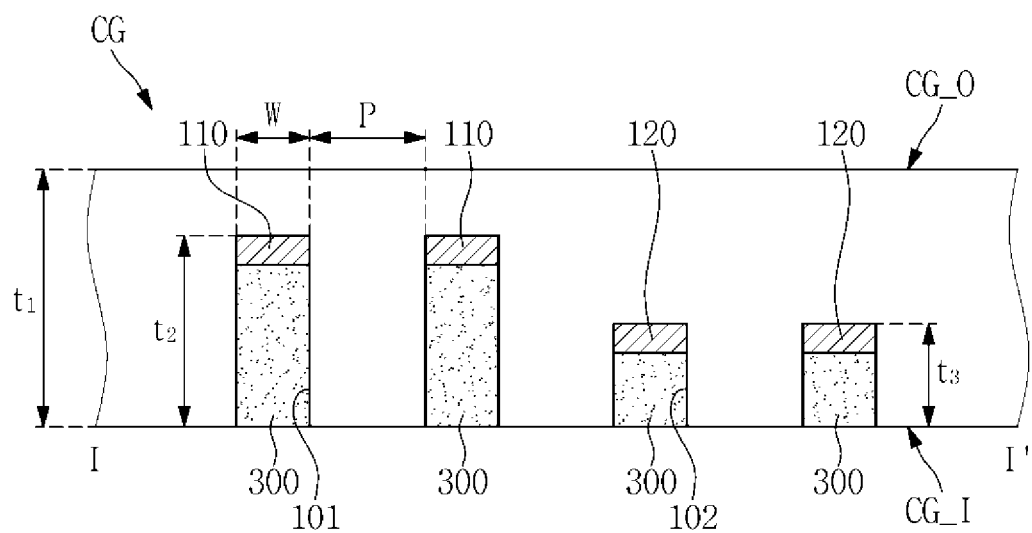
FIG. 3 is a cross-sectional view taken along the line I-I' of FIG. 2.
Figure 4:
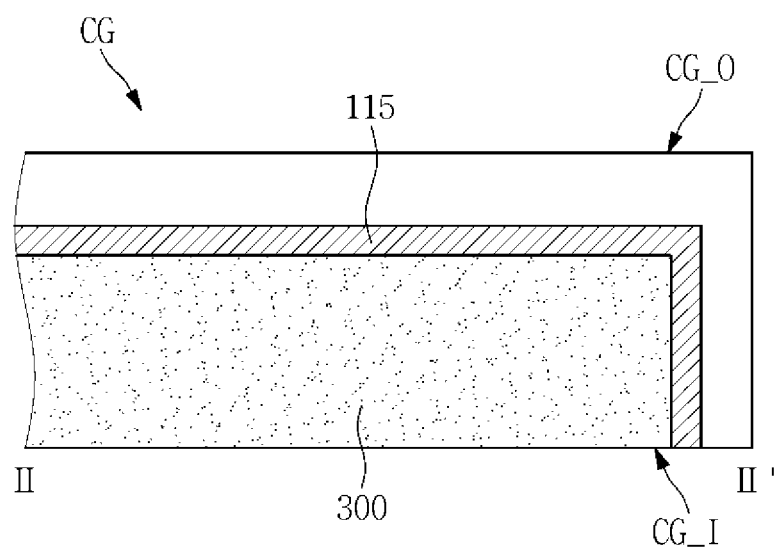
FIG. 4 is a cross-sectional view taken along the line II-II' of FIG. 2.

FIG. 1 is a schematic perspective view illustrating a display device according to a first exemplary embodiment, FIG. 2 is an enlarged view illustrating the area "A" of FIG. 1, FIG. 3 is a cross-sectional view taken along the line I-I' of FIG. 2, and FIG. 4 is a cross-sectional view taken along the line II-II' of FIG. 2.

Referring to FIGS. 1-4, the display device according to the first exemplary embodiment may include a display panel DP including a plurality of pixels PX for displaying images, a touch panel TP on the display panel DP, and a cover glass CG on the touch panel TP.

In an exemplary embodiment, the display panel DP may be a liquid crystal display (LCD) panel, an organic light emitting diode (OLED) display panel, a plasma display panel (PDP), or an electrophoretic display (EPD) panel. However, the present invention is not limited thereto.

The display panel DP may include the plurality of pixels PX that are arranged in a matrix form. In the drawings, each of the pixels PX is depicted as having a substantially lozenge shape, but the present invention is not limited thereto. The pixels PX may have various suitable shapes, such as a substantially quadrangular shape and/or a substantially triangular shape.

Although each of the pixels PX may include a red pixel, a green pixel, and/or a blue pixel, the present invention is not limited thereto. Each of the pixels PX may be a red, green, blue, cyan, magenta, yellow, and/or white pixel.

The touch panel TP may be disposed on the display panel DP.

According to an exemplary embodiment, the touch panel TP includes a plurality of sensing electrodes that are disposed on a substrate, but the present invention is not limited thereto. In an exemplary embodiment, the touch panel TP may be an on-cell type that is directly disposed on the display panel DP without a separate substrate or may be an in-cell type that is formed in the display panel DP.

According to an exemplary embodiment, the touch panel TP includes sensing electrodes arranged in different layers and operates according to a capacitance difference detected by the sensing electrodes, but the present invention is not limited thereto. The touch panel TP may have a structure in which the sensing electrodes for detecting a capacitance change are disposed on substantially a same layer and may be separated from one another using a bridge electrode.

The cover glass CG may be disposed on the touch panel TP. The cover glass CG may include or be formed of glass, sapphire, diamond, poly(methyl methacrylate) (PMMA), and/or polycarbonate (PC). The cover glass CG may include a fingerprint recognition area FA on a plane. In an exemplary embodiment, the fingerprint recognition area FA may be an edge portion of the cover glass CG on a plane. For example, the fingerprint recognition area FA may be a central portion of an edge portion of the cover glass CG on a plane. However, the present invention is not limited thereto, and the fingerprint recognition area FA may be any suitable area of the cover glass CG and may include a plurality of areas.

An exemplary embodiment of the fingerprint recognition area FA is depicted as having a lozenge shape in FIG. 1, but the present invention is not limited thereto. The fingerprint recognition area FA may substantially have a quadrangular shape, a triangular shape, a lozenge shape, a circular shape, an elliptical shape, a semicircular shape, a polygonal shape, and combinations thereof.

In an exemplary embodiment, an area of the fingerprint recognition area FA may be in a range of about several square millimeters (mm²) to about several tens of square millimeters. However, the present invention is not limited thereto, and the fingerprint recognition area FA may have an area suitable to the size and desired use of the display device.

The cover glass CG according to the first exemplary embodiment may include, in the fingerprint recognition area FA, a plurality of first sensing electrodes 110 extending in one direction, a plurality of second sensing electrodes 120 extending in a direction crossing the one direction, first routing wirings 115 connected to the first sensing electrodes 110 (e.g., first routing wirings 115 connected to respective ones of the first sensing electrodes 110), and second routing wirings 125 connected to the second sensing electrodes 120 (e.g., second routing wirings 125 connected to respective ones of the second sensing electrodes 120).

In an exemplary embodiment, the cover glass CG may include an outer surface CG_O that is externally exposed and an inner surface CG_I that faces the display panel DP. In addition, the cover glass CG may have a thickness t1 in a range from about 300 μm to about 550 μm.

The cover glass CG according to the first exemplary embodiment may have, in the inner surface CG_I thereof, a plurality of first grooves 101 extending in one direction and a plurality of second grooves 102 extending in a direction crossing the one direction, but the present invention is not limited thereto. In another exemplary embodiment, the cover glass CG may have the first grooves 101 and the second grooves 102 in the outer surface CG_O thereof, or the cover glass CG may have the first grooves 101 in the outer surface CG_O thereof and have the second grooves 102 in the inner surface CG_I thereof.

The first groove 101 may have substantially a same shape as that of the first sensing electrode 110 on a plane (e.g., each of the first grooves 101 may have substantially a same shape or may have a shape corresponding to as a respective one of the first sensing electrodes 110). In FIG. 2, when the first sensing electrode 110 has a bar shape extending in one direction on a plane, the first groove 101 may also have a bar shape extending in the one direction on the plane. However, the present invention is not limited thereto, and in an embodiment in which the first sensing electrode 110 includes a bar-shaped stem portion and a branch portion branching off from the stem portion, the first groove 101 may have substantially a same shape as that of the first sensing electrode 110. Similarly, the second groove 102 may have substantially a same shape as that of the second sensing electrode 120 on a plane (e.g., each of the second grooves 102 may have substantially a same shape or may have a shape corresponding to as a respective one of the second sensing electrodes 120).

Although five first sensing electrodes 110 and five second sensing electrodes 120 are depicted in FIG. 2, the number of the first sensing electrodes 110 and the number of the second sensing electrodes 120 are not limited thereto. The number of the first sensing electrodes 110 and the number of the second sensing electrodes 120 may vary according to, for example, a desired accuracy level of fingerprint sensing.

In addition, the first sensing electrode 110 and the second sensing electrode 120 may be disposed on a boundary area of the plurality of pixels PX disposed on the display panel DP. For example, the first sensing electrode 110 and the second sensing electrode 120 may be disposed to be between the pixels PX on a plane.

In an exemplary embodiment, a line width of the first sensing electrode 110 may be in a range of about several micrometers (μm) to about several tens of micrometers, and a pitch between adjacent ones of the first sensing electrodes 110 may be in a range of about several micrometers to about several tens of micrometers. Accordingly, a width W of the first groove 101 may be in a range of about several micrometers to about several tens of micrometers, and a pitch P between adjacent ones of the first grooves 101 may be in a range of about several micrometers to about several tens of micrometers. Similarly, a width W of the second groove 102 may in a range of about several micrometers to about several tens of micrometers, and a pitch P between adjacent ones of the second grooves 102 may be in a range of about several micrometers to about several tens of micrometers.

For example, a line width of the first sensing electrode 110 may be in a range of about 10 μm to about 50 μm, and a pitch between adjacent ones of the first sensing electrodes 110 may be in a range of about 10 μm to about 50 μm.

Accordingly, a width W of the first groove 101 may be in a range of about 10 μm to about 50 μm, and a pitch P between adjacent ones of the first grooves 101 may be in a range of about 10 μm to about 50 μm. Similarly, a width W of the second groove 102 may be in a range of about 10 μm to about 50 μm, and a pitch P between adjacent ones of the second grooves 102 may be in a range of about 10 μm to about 50 μm.

In an exemplary embodiment, the first groove 101 and the second groove 102 may have different depths. For example, the first groove 101 may have a depth t2 in a range from about 200 μm to about 450 μm, and the second groove 102 may have a depth t3 that is less than the depth t2 of the first groove 101. However, the present invention is not limited thereto, and the first groove 101 may have a smaller depth than that of the second groove 102 or the first groove 101 and the second groove 102 may have substantially a same depth.

The first sensing electrode 110 may be disposed in the first groove 101 (e.g., the first sensing electrodes 110 may be respectively disposed in the first grooves 101). The first routing wiring 115 connected to the first sensing electrode 110 may also be disposed in the first groove 101. For example, the first groove 101 may have substantially a same shape on a plane as that of the first sensing electrode 110 and the first routing wiring 115. However, the present invention is not limited thereto, and the first routing wiring 115 may not be disposed in the first groove 101 but may be connected to a fingerprint recognition unit 600, to be described below, with an additional wiring.

The first sensing electrode 110 may include a metal or a transparent conductive oxide (TCO). The TCO may include indium tin oxide (ITO), indium zinc oxide (IZO), zinc oxide (ZnO), carbon nanotube (CNT), and/or graphene.

A filling member 300 may be disposed in the first groove 101 in which the first sensing electrode 110 is disposed.

The filling member 300 may be (or may include) any suitable, commonly used transparent filling material without limitation. For example, the filling member 300 may be an optical clear resin (OCR).

The second sensing electrode 120 may be disposed in the second groove 102 (e.g., the second sensing electrodes 120 may be respectively disposed in the second grooves 102). The second routing wiring 125 connected to the second sensing electrode 120 may also be disposed in the second groove 102. For example, the second groove 102 may have substantially a same shape on a plane as that of the second sensing electrode 120 and the second routing wiring 125. However, the present invention is not limited thereto, and the second routing wiring 125 may not be disposed in the second groove 102 but may be connected to the fingerprint recognition unit 600, to be described below, with an additional wiring.

The second sensing electrode 120 may include a metal or a TCO. The TCO may include ITO, IZO, ZnO, CNT, and/or graphene.

The filling member 300 may be disposed in the second groove 102 in which the second sensing electrode 120 is disposed.

The filling member 300 may be (or may include) any suitable, commonly used transparent filling material without limitation. For example, the filling member 300 may be an OCR.

The first sensing electrode 110 may be electrically connected to the first routing wiring 115, and the second sensing electrode 120 may be electrically connected to the second routing wiring 125. The first routing wirings 115 and the second routing wirings 125 may be connected to the fingerprint recognition unit 600. For example, referring to FIG. 4, the first routing wirings 115 may be bent at an end portion of the cover glass CG to be connected to the fingerprint recognition unit 600. Likewise, the second routing wirings 125 may be bent at an end portion of the cover glass CG to be connected to the fingerprint recognition unit 600.

The fingerprint recognition unit 600 inputs a driving signal to the first sensing electrode 110 and recognizes fingerprints based on a capacitance variation or a voltage variation measured by the second sensing electrode 120.

For example, when a touch action is performed to the fingerprint recognition area FA (e.g., when a touch action is performed to the fingerprint recognition area FA for an amount of time or longer), the fingerprint recognition unit 600 may recognize the touched fingerprint and generate fingerprint information.

A fingerprint is a raised wrinkle at the last joint of human fingers and includes ridges and valleys between the ridges. When a finger contacts the fingerprint recognition area FA, the ridges contact the fingerprint recognition area FA, but the valleys do not. Thus, coordinates at which a capacitance measured by the second sensing electrode 120 change may correspond to ridges, and coordinates at which a capacitance does not change may correspond to valleys. In such a manner, fingerprints may be recognized.

The fingerprint recognition unit 600 may be directly disposed on the touch panel TP in the form of an integrated circuit (IC) or may be provided as a separate component.

In an exemplary embodiment, the display device may improve the sensitivity of fingerprint sensing by narrowing a distance between a finger and the sensing electrodes through a method of embedding the sensing electrodes for fingerprint recognition in the cover window.

Figure 5:
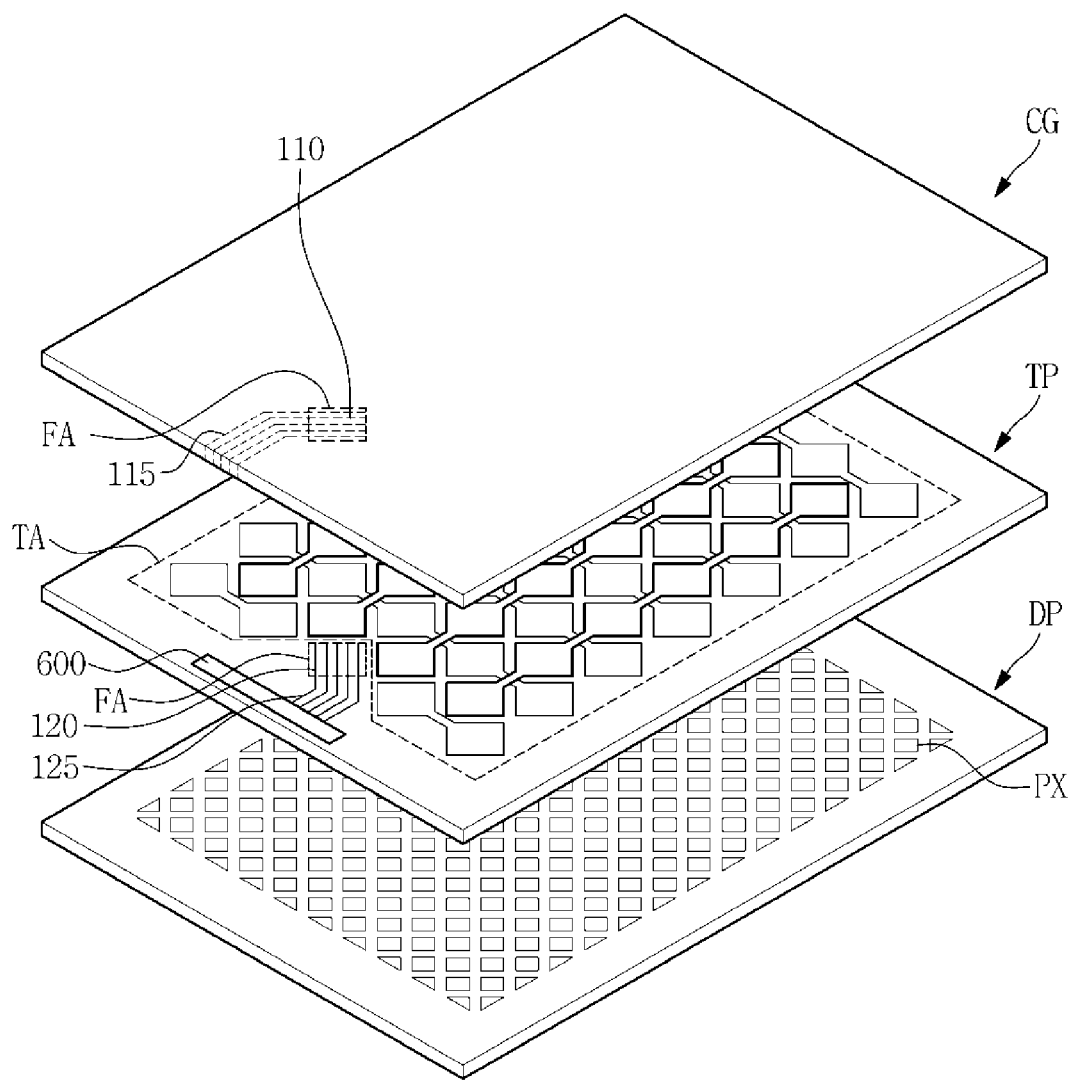
FIG. 5 is a schematic perspective view illustrating a display device according to a second exemplary embodiment.
Figure 6:
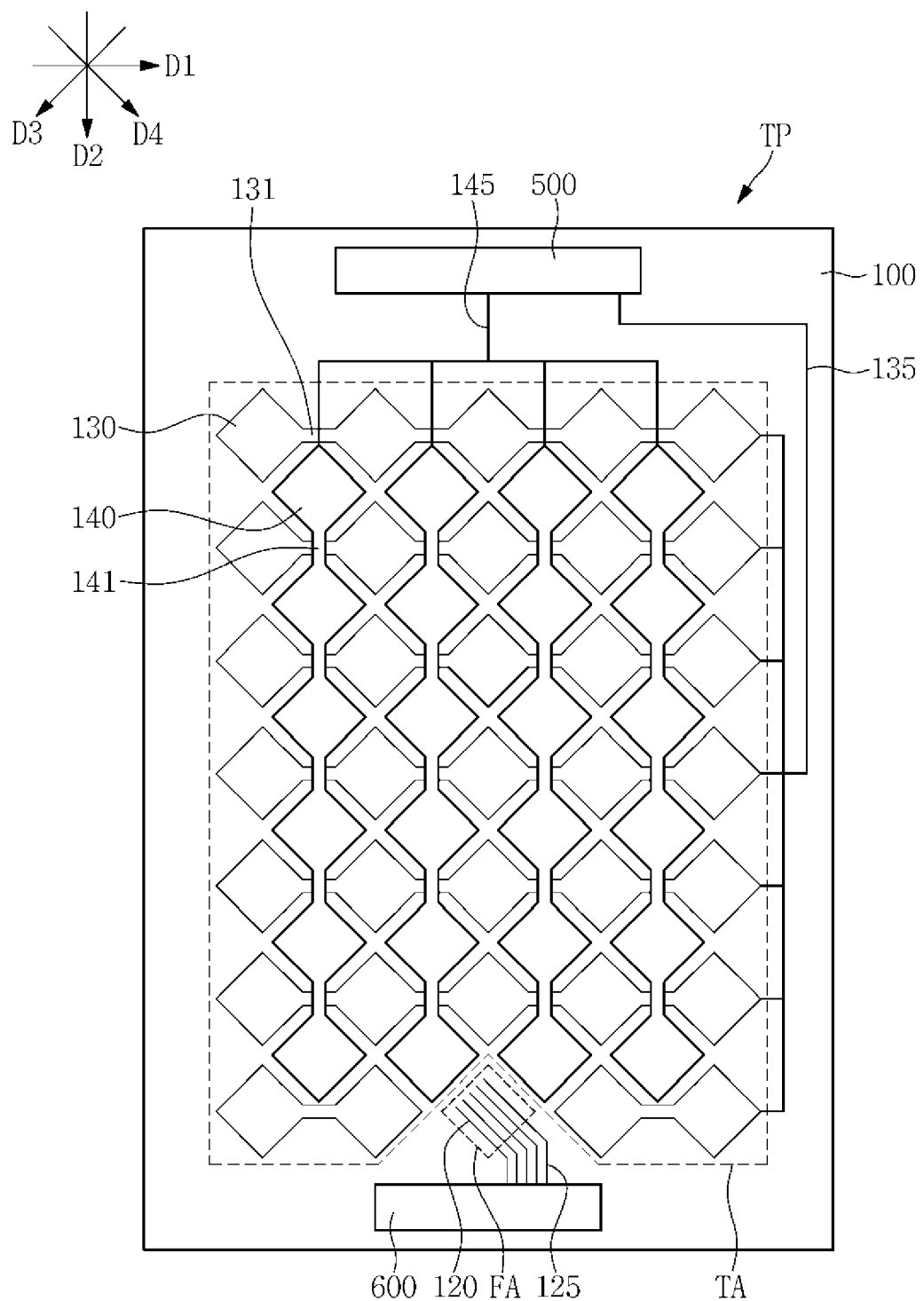
FIG. 6 is a plan view illustrating a touch panel according to the second exemplary embodiment.

FIG. 5 is a schematic perspective view illustrating a display device according to a second exemplary embodiment, and FIG. 6 is a plan view illustrating a touch panel according to the second exemplary embodiment. Descriptions of repeated elements between the display device according to the first exemplary embodiment may be omitted from the description of the display device according to the second exemplary embodiment.

Referring to FIGS. 5 and 6, the display device according to the second exemplary embodiment may include a display panel DP including a plurality of pixels PX for displaying images, a touch panel TP on the display panel DP, and a cover glass CG on the touch panel TP, for example.

The cover glass CG according to the second exemplary embodiment may include, in a fingerprint recognition area FA, a plurality of first sensing electrodes 110 extending in a third direction D3 and first routing wirings 115 connected to the first sensing electrodes 110.

The cover glass CG may have, on one surface thereof, a groove (not illustrated) having substantially a same shape on a plane as that of the first sensing electrode 110 and the first routing wiring 115. The first sensing electrode 110 and the first routing wiring 115 may be disposed in the groove of the cover glass CG, and a filling member (not illustrated) may be disposed on the first sensing electrode 110 and the first routing wiring 115. The first routing wiring 115 may be connected to a fingerprint recognition unit 600 on the touch panel TP.

The touch panel TP according to the second exemplary embodiment includes a substrate 100 including a touch recognition area TA and a fingerprint recognition area FA, a plurality of third sensing electrodes 130 and a plurality of fourth sensing electrodes 140 arranged into a matrix form in the touch recognition area TA of the substrate 100, a first connection electrode 131 connecting adjacent ones of the third sensing electrodes 130 in a first direction D1, and a second connection electrode 141 connecting adjacent ones of the fourth sensing electrodes 140 in a second direction D2 crossing the first direction D1.

The third sensing electrode 130 and the fourth sensing electrode 140 may be disposed not to overlap one another on a plane. The first connection electrode 131 and the second connection electrode 141 may cross one another on a plane.

Although the third sensing electrode 130 and the fourth sensing electrode 140 are depicted as having a lozenge-shaped planar electrode shape in FIG. 6, the present invention is not limited thereto. In an exemplary embodiment, the third sensing electrode 130 and the fourth sensing electrode 140 may substantially have a quadrangular shape, a triangular shape, a lozenge shape, a circular shape, an elliptical shape, a semicircular shape, a polygonal shape, and combinations thereof.

The third sensing electrode 130, the first connection electrode 131, the fourth sensing electrode 140, and the second connection electrode 141 may have a mesh shape.

The third sensing electrode 130 and the fourth sensing electrode 140 may have suitable sizes to detect a touch input based on the size and desired use of the display device. For example, the third sensing electrode 130 and the fourth sensing electrode 140 may have an area in a range from about several square millimeters ($mm^2$) to about several tens of square millimeters.

In the exemplary embodiment of the touch panel TP shown in FIGS. 5 and 6, the fingerprint recognition area FA is depicted as having substantially a same area as an area of one of the third sensing electrode 130 or the fourth sensing electrode 140, but the present invention is not limited thereto. An area of the fingerprint recognition area FA may be integer multiples (e.g., about two to about five times) of an area of one of the third sensing electrode 130 or the fourth sensing electrode 140, or may have a suitable value based on the size and desired use of the display device.

The third sensing electrode 130, the first connection electrode 131, the fourth sensing electrode 140, and the second connection electrode 141 may include a metal or a TCO. The TCO may include ITO, IZO, ZnO, CNT, and/or graphene.

The third sensing electrode 130 may be electrically connected to a third routing wiring 135, and the fourth sensing electrode 140 may be electrically connected to a fourth routing wiring 145. The third routing wiring 135 and the fourth routing wiring 145 may be connected to a touch driver 500.

The touch driver 500 inputs a driving signal to the third sensing electrode 130 and detects the presence of a touch input and touch coordinates based on a capacitance variation and a voltage variation measured by the fourth sensing electrode 140.

The touch driver 500 may be disposed directly on the substrate 100 in the form of an IC or may be provided as a separate component. The touch driver 500 may be disposed on the substrate 100 to oppose the fingerprint recognition unit 600.

For example, as illustrated in FIG. 5, when the touch driver 500 is disposed at an upper portion (e.g., an upper edge) of the substrate 100 in a plan view, the fingerprint recognition unit 600 may be disposed at a lower portion (e.g., a lower edge) of the substrate 100 in the plan view. Similarly, when the touch driver 500 is disposed at a lower portion of the substrate 100 in a plan view, the fingerprint recognition unit 600 may be disposed at an upper portion of the substrate 100 in the plan view.

However, the present invention is not limited thereto, and the touch driver 500 and the fingerprint recognition unit 600 may be disposed on the same side (e.g., the same edge), or in other exemplary embodiments, may be integrated into a single IC.

In addition, the touch panel TP according to the second embodiment may include, on the substrate 100 and in the fingerprint recognition area FA, a plurality of second sensing electrodes 120 extending in a fourth direction D4 and second routing wirings 125 connected to the second sensing electrodes 120. The second routing wirings 125 may be connected to the fingerprint recognition unit 600 on the touch panel TP.

The first sensing electrode 110 embedded in the cover glass CG and the second sensing electrode 120 disposed on the touch panel TP may be alternately disposed on a plane.

In addition, the first sensing electrode 110 and the second sensing electrode 120 may be disposed in a boundary area of the plurality of pixels PX on the display panel DP. For example, the first sensing electrode 110 and the second sensing electrode 120 may be disposed to be between the pixels PX on a plane.

Figure 7:
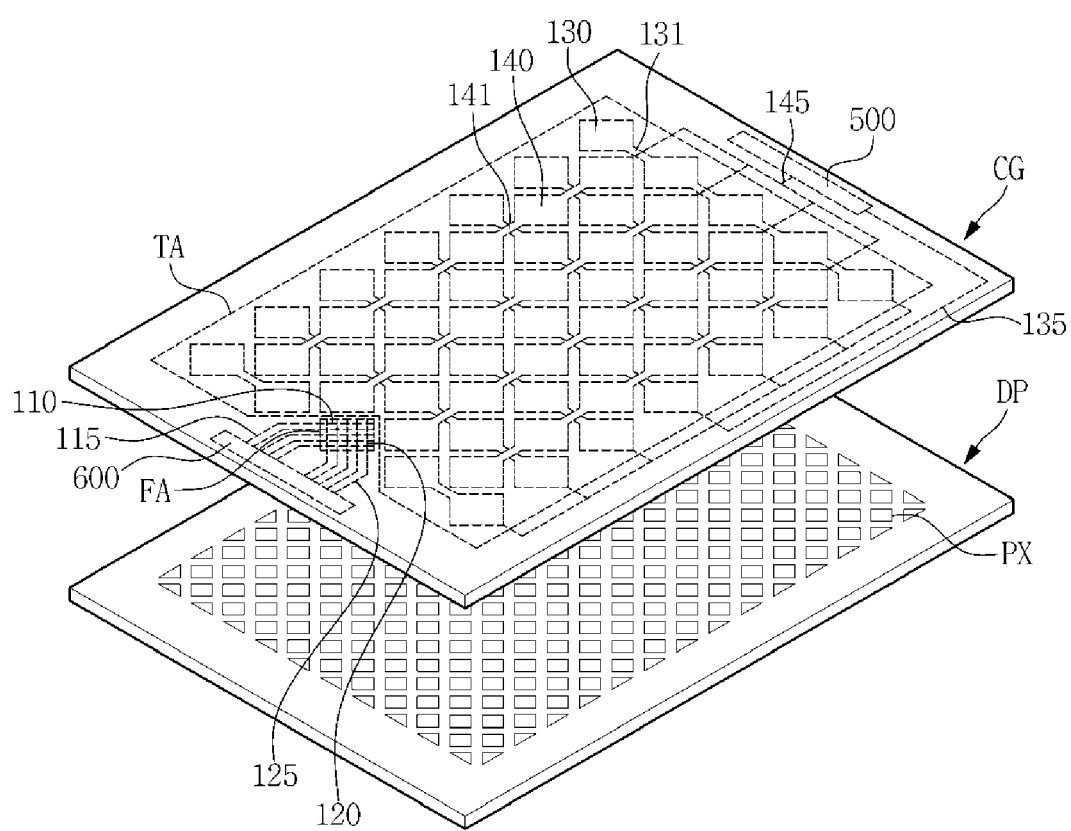
FIG. 7 is a schematic perspective view illustrating a display device according to a third exemplary embodiment.

FIG. 7 is a schematic perspective view illustrating a display device according to a third exemplary embodiment.

Descriptions of repeated elements of the display device according to the first and second exemplary embodiments may be omitted from the description of the display device according to the third exemplary embodiment.

Referring to FIG. 7, the display device according to the third exemplary embodiment may include a display panel DP including a plurality of pixels PX for displaying an image and a cover glass CG on the display panel DP, for example.

The cover glass CG according to the third exemplary embodiment may include a touch recognition area TA and a fingerprint recognition area FA.

The cover glass CG according to the third exemplary embodiment may include, in the fingerprint recognition area FA, a plurality of first sensing electrodes 110 extending in one direction, first routing wirings 115 connected to the first sensing electrodes 110 (e.g., first routing wirings 115 connected to respective ones of the first sensing electrodes 110), a plurality of second sensing electrodes 120 extending in a direction crossing the one direction, and second routing wirings 125 connected to the second sensing electrodes 120 (e.g., second routing wirings 125 connected to respective ones of the second sensing electrodes 120).

The first routing wirings 115 and the second routing wirings 125 may be connected to a fingerprint recognition unit 600.

In addition, the cover glass CG may include, in the touch recognition area TA, a plurality of third sensing electrodes 130 and a plurality of fourth sensing electrodes 140 arranged into a matrix form, a first connection electrode 131 connecting adjacent ones of the third sensing electrodes 130 in a first direction D1, and a second connection electrode 141 connecting adjacent ones of the fourth sensing electrodes 140 in a second direction D2 crossing the first direction D1, for example.

The third sensing electrode 130 may be electrically connected to a third routing wiring 135 and the fourth sensing electrode 140 may be electrically connected to a fourth routing wiring 145. The third routing wiring 135 and the fourth routing wiring 145 may be connected to a touch driver 500.

The cover glass CG may have, on one surface thereof, a groove (not illustrated) defined to have substantially a same shape on a plane as a shape of the first sensing electrode 110, the second sensing electrode 120, the third sensing electrode 130, and the fourth sensing electrode 140.

An exemplary embodiment of the display device may improve the sensitivity of fingerprint sensing and the sensitivity of touch sensing by narrowing or reducing a distance between a finger and the sensing electrodes through a method of embedding the sensing electrodes for fingerprint recognition and the sensing electrodes for touch recognition in the cover window.

FIGS. 8-13 illustrate a method of manufacturing a display device according to the first exemplary embodiment.

The method of manufacturing the display device according to the first exemplary embodiment may include: preparing a display panel including a plurality of pixels, defining a plurality of first grooves in a cover glass on the display panel, defining a plurality of second grooves in the cover glass to cross (e.g., intersect) the first grooves, forming a first sensing electrode in the first groove, forming a filling member on the first sensing electrode, and forming a second sensing electrode in the second groove.

Figure 8:
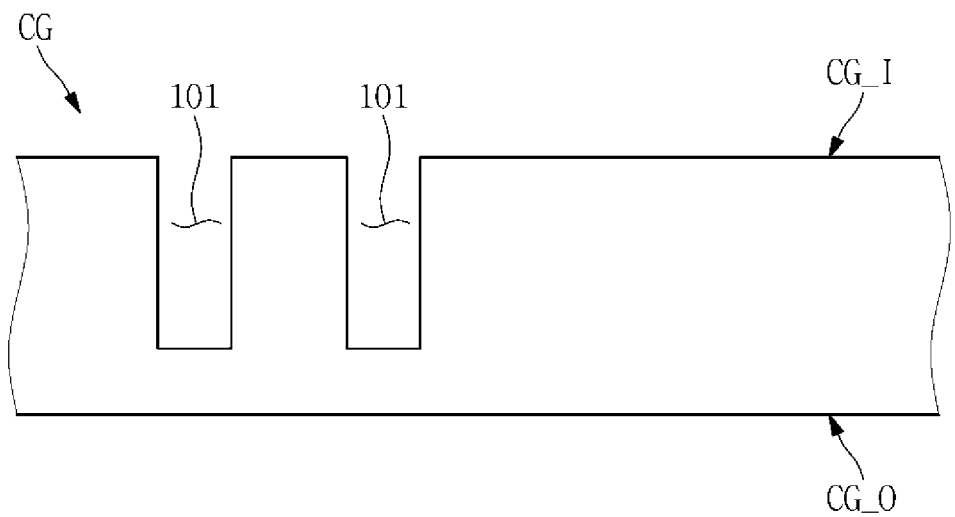
FIGS. 8-13 illustrate a method of manufacturing a display device according to the first exemplary embodiment.

Referring to FIG. 8, a plurality of first grooves 101 may be defined in an inner surface CG_I of a cover glass CG. The first grooves 101 may be defined by an etching process or a thermal chamfering process.

The first grooves 101 may be defined to have substantially a same shape on a plane as a shape of first sensing electrodes 110 to be described below. For example, when a line width of the first sensing electrode 110 is in a range of about 10 μm to about 50 μm and a pitch between adjacent ones of the first sensing electrodes 110 is in a range of about 10 μm to about 50 μm, the first grooves 101 may have a width in a range from about 10 μm to about 50 μm and a pitch in a range from about 10 μm to about 50 μm.

In addition, when a thickness of the cover glass CG is in a range of about 300 μm to about 550 μm, the first grooves 101 may be defined to have a depth in a range from about 220 μm to about 450 μm.

Figure 9:
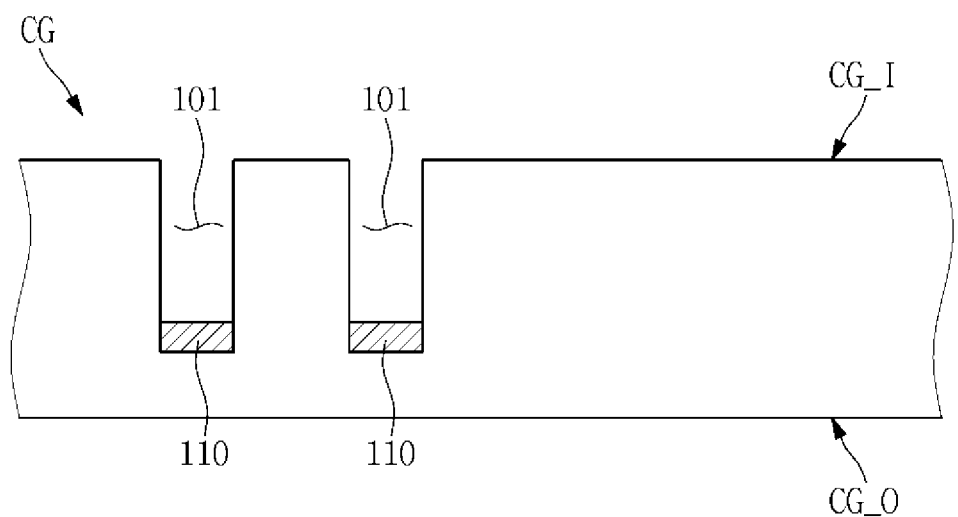

Subsequently, referring to FIG. 9, the first sensing electrodes 110 may be formed in the first grooves 101 of the cover glass CG. The first sensing electrodes 110 may include a metal or a TCO. The TCO may include ITO, IZO, ZnO, CNT, and/or graphene.

Figure 10:
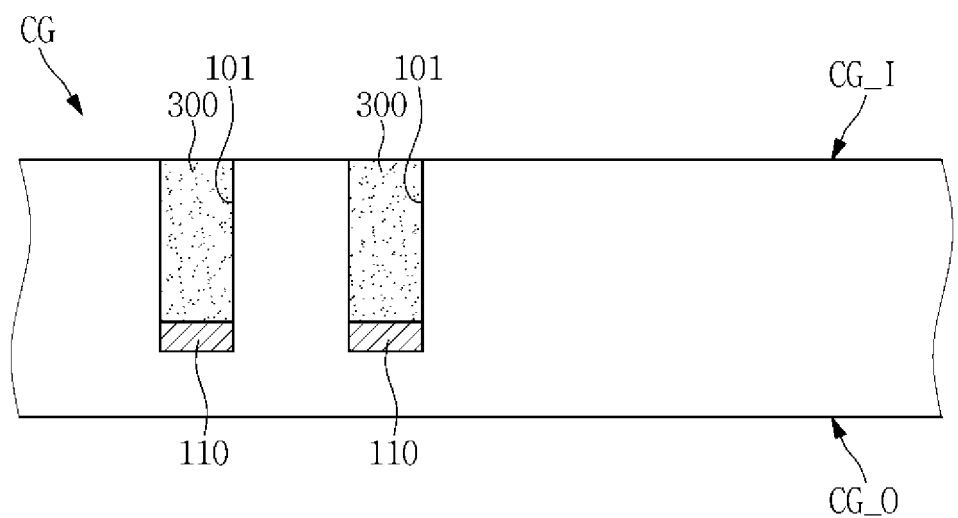

Subsequently, referring to FIG. 10, the first grooves 101 in which the first sensing electrodes 110 are formed are filled with a filling member 300. The filling member 300 may use any suitable, commonly used transparent filling material without limitation. For example, the filling member 300 may be an OCR.

Figure 11:
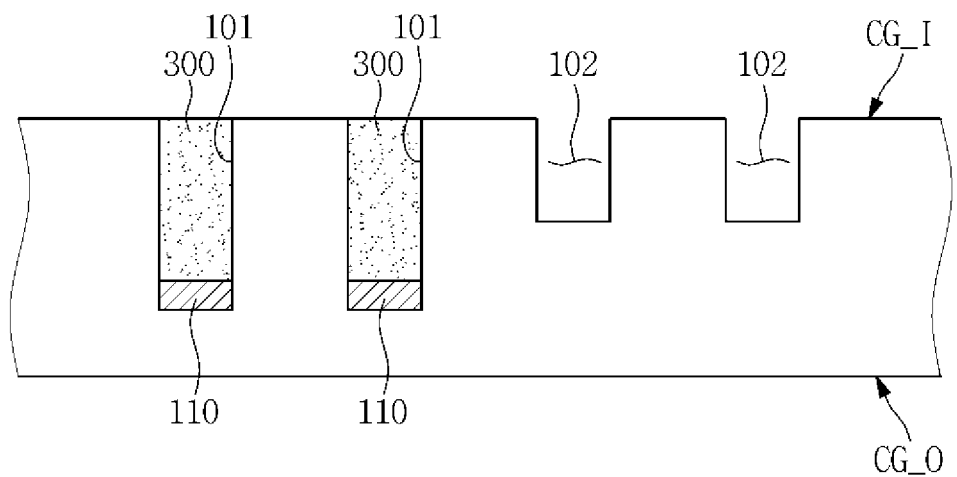

Subsequently, referring to FIG. 11, a plurality of second grooves 102 may be defined in the inner surface CG_I of the cover glass CG. The second grooves 102 may be defined to cross (e.g., intersect) a portion of the first grooves 101. The second grooves 102 may be defined through an etching process or a thermal chamfering process.

The second groove 102 may be defined to have substantially a same shape on a plane as a shape of second sensing electrodes 120 to be described below. For example, when a line width of the second sensing electrodes 120 is in a range of about 10 μm to about 50 μm and a pitch between adjacent ones of the second sensing electrodes 120 is in a range of about 10 μm to about 50 μm, the second grooves 102 may have a width in a range from about 10 μm to about 50 μm and a pitch in a range from about 10 μm to about 50 μm.

In addition, the second grooves 102 may have a different depth than a depth of the first grooves 101. For example, the second grooves 102 may have a smaller depth than the depth of the first grooves 101.

Figure 12:
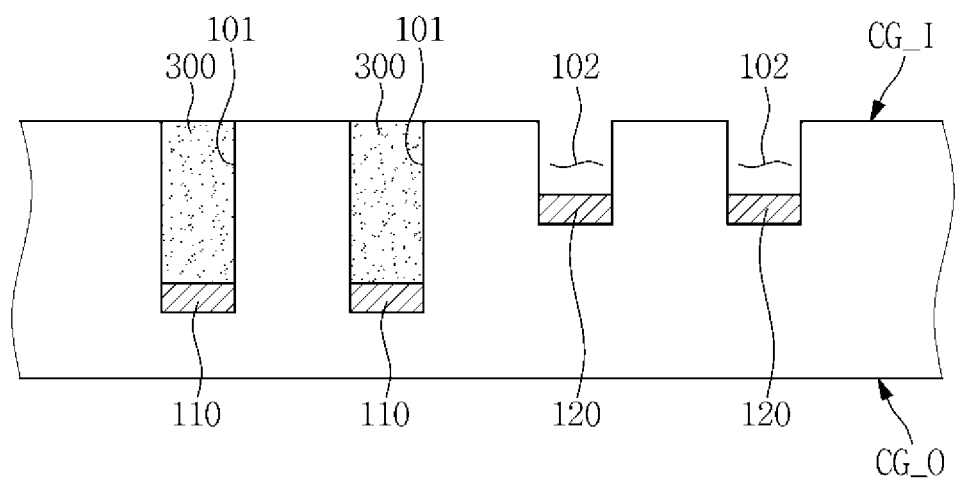

Subsequently, referring to FIG. 12, the second sensing electrodes 120 may be formed in the second grooves 102 of the cover glass CG. The second sensing electrodes 120 may include a metal or a TCO. The TCO may include ITO, IZO, ZnO, CNT, and/or graphene.

Figure 13:
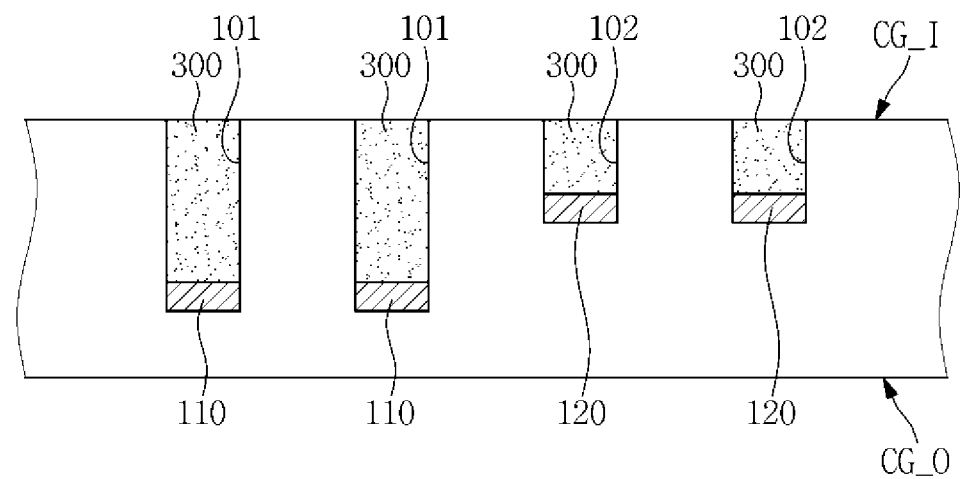

Subsequently, referring to FIG. 13, the second grooves 102 in which the second sensing electrodes 120 are formed are filled with the filling member 300. The filling member 300 may use any suitable, commonly used transparent filling material without limitation. For example, the filling member 300 may be an OCR.

Subsequently, the display panel and the cover glass are bonded together to provide a display device.

As set forth hereinabove, in one or more exemplary embodiments, the display device may improve the sensitivity of the fingerprint recognition sensor by narrowing a distance between a finger and the sensing electrodes through a method of embedding the sensing electrodes for fingerprint recognition in the cover window.

While the present invention has been shown and described with reference to exemplary embodiments thereof, it will be apparent to those of ordinary skill in the art that various changes in form and detail may be made thereto without departing from the spirit and scope of the present invention as defined by the appended claims and their equivalents.

What is claimed is:

1. A display device comprising:
   a display panel comprising a plurality of pixels;
   a touch panel on the display panel;
   a cover glass on the touch panel and having a plurality of first grooves;
   a plurality of first sensing electrodes respectively in the plurality of first grooves; and
   a filling member on the first sensing electrodes and in the plurality of first grooves,
   wherein the plurality of first grooves have a shape on a plane corresponding to a shape of the plurality of first sensing electrodes, and
   wherein a total area of the plurality of first sensing electrodes is substantially the same as a total area of the plurality of first grooves in a plan view.

2. The display device as claimed in claim 1, wherein one of the first grooves has substantially a same width as a line width of one of the first sensing electrodes.

3. The display device as claimed in claim 2, wherein each of the first sensing electrodes has a line width in a range from about several micrometers to about several tens of micrometers.

4. The display device as claimed in claim 1, wherein a pitch between adjacent ones of the first grooves is in a range of about several micrometers to about several tens of micrometers.

5. The display device as claimed in claim 1, wherein the cover glass has a thickness in a range from about 300 μm to about 550 μm.

6. The display device as claimed in claim 1, wherein each of the first grooves has a depth in a range from about 200 μm to about 450 μm.

7. The display device as claimed in claim 1, further comprising a second sensing electrode on the touch panel.

8. The display device as claimed in claim 1, wherein the cover glass has a second groove crossing the first grooves.

9. The display device as claimed in claim 8, further comprising a second sensing electrode in the second groove, wherein the second sensing electrode is insulated from and crosses the first sensing electrodes on a plane.

10. The display device as claimed in claim 9, wherein the second groove has a shape on a plane corresponding to a shape of the second sensing electrode.

11. The display device as claimed in claim 9, wherein the second groove has substantially a same width as a line width of the second sensing electrode.

12. The display device as claimed in claim 9, wherein the second groove has a depth that is less than a depth of the first grooves.

13. The display device as claimed in claim 1, wherein the filling member is an optical clear resin.

14. A display device comprising:
- a display panel comprising a plurality of pixels;
- a touch panel on the display panel;
- a fingerprint recognition unit on the touch panel;
- a cover glass on the touch panel and having a plurality of first grooves;
- a plurality of first sensing electrodes respectively in the plurality of first grooves;
- a plurality of first routing wirings connected to the plurality of first sensing electrodes and the fingerprint recognition unit; and
- a filling member on the first sensing electrodes and in the plurality of first grooves,
- wherein a total area of the plurality of first sensing electrodes is substantially the same as a total area of the plurality of first grooves in a plan view.

15. The display device as claimed in claim 14, wherein the touch panel comprises:
- a plurality of second sensing electrodes; and
- a plurality of second routing wirings connected to the plurality of second sensing electrodes and the fingerprint recognition unit, and
- wherein the plurality of first sensing electrodes and the plurality of second sensing electrodes are disposed to cross each other.

16. The display device as claimed in claim 15, wherein the plurality of first routing wirings and the plurality of second routing wirings do not cross each other.

17. The display device as claimed in claim 14, further comprising:
- a plurality of second sensing electrodes; and
- a plurality of second routing wirings connected to the plurality of second sensing electrodes and the fingerprint recognition unit,
- wherein the cover glass has a plurality of second grooves intersecting the plurality of first grooves,
- wherein the plurality of second sensing electrodes are in the plurality of second grooves, and
- wherein the plurality of first sensing electrodes and the plurality of second sensing electrodes are disposed to cross each other.

18. The display device as claimed in claim 17, wherein the plurality of first routing wirings and the plurality of second routing wirings do not cross each other.

19. The display device as claimed in claim 1, wherein the first sensing electrodes are not disposed between the plurality of first grooves.

20. The display device as claimed in claim 1, wherein the plurality of first grooves have substantially same depths.

* * * * *